US012266248B2

(12) United States Patent
Rogers

(10) Patent No.: US 12,266,248 B2
(45) Date of Patent: Apr. 1, 2025

(54) ADAPTATION OF A SECURITY CONTROL PANEL

(71) Applicant: Alarm.com Incorporated, Tysons, VA (US)

(72) Inventor: Thomas Rogers, Frederick, MD (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/196,239

(22) Filed: May 11, 2023

(65) Prior Publication Data

US 2023/0290236 A1 Sep. 14, 2023

Related U.S. Application Data

(63) Continuation of application No. 17/140,218, filed on Jan. 4, 2021, now Pat. No. 11,682,279, which is a continuation of application No. 16/696,004, filed on Nov. 26, 2019, now Pat. No. 10,885,756, which is a continuation of application No. 15/971,438, filed on May 4, 2018, now Pat. No. 10,497,235.

(60) Provisional application No. 62/504,042, filed on May 10, 2017.

(51) Int. Cl.
*G08B 21/00* (2006.01)
*G08B 13/196* (2006.01)

(52) U.S. Cl.
CPC . *G08B 13/19658* (2013.01); *G08B 13/19639* (2013.01); *G08B 13/1968* (2013.01); *G08B 13/19691* (2013.01)

(58) Field of Classification Search
CPC ........ G08B 13/19658; G08B 13/19639; G08B 13/1968; G08B 13/19691; G08B 25/08
USPC .......................................................... 340/541
See application file for complete search history.

(56) References Cited

U.S. PATENT DOCUMENTS

| | | | | |
|---|---|---|---|---|
| 9,412,248 | B1 * | 8/2016 | Cohn | H04L 12/2809 |
| 2003/0093701 | A1 * | 5/2003 | Freyman | H04M 19/08 713/300 |
| 2003/0227540 | A1 * | 12/2003 | Monroe | G08B 13/19645 348/E7.086 |
| 2006/0146883 | A1 * | 7/2006 | Cioffi | H04Q 1/025 370/492 |
| 2007/0043954 | A1 | 2/2007 | Fox | |
| 2009/0022362 | A1 | 1/2009 | Gagvani et al. | |
| 2011/0254680 | A1 | 10/2011 | Perkinson et al. | |
| 2013/0120131 | A1 | 5/2013 | Hicks, III | |
| 2013/0141239 | A1 | 6/2013 | Petricoin, Jr. | |

(Continued)

*Primary Examiner* — Mark S Rushing
(74) *Attorney, Agent, or Firm* — Fish & Richardson P.C.

(57) ABSTRACT

A computer implemented method includes receiving one or more user set preferences for detecting a hub alarm condition and one or more actions to perform in response to detecting a hub alarm condition, receiving, from the output of the security panel, data indicating that a traditional alarm condition occurred, based on receiving data indicating a traditional alarm condition occurred at the monitored property, receiving sensor data from at least one wireless sensor in a vicinity of a hardwired sensor associated with the traditional alarm condition, determining, based on the sensor data received from at least one wireless sensor in a vicinity of the hardwired sensor associated the traditional alarm condition, that the sensor data satisfies a condition, and in response to determining that the sensor data satisfies a condition, performing an action.

20 Claims, 5 Drawing Sheets

(56) References Cited

U.S. PATENT DOCUMENTS

| | | | | |
|---|---|---|---|---|
| 2015/0123783 | A1* | 5/2015 | Elliot | G08B 29/02 340/506 |
| 2015/0254950 | A1 | 9/2015 | Patterson et al. | |
| 2015/0287307 | A1 | 10/2015 | Rasband | |
| 2016/0189529 | A1 | 6/2016 | Lee et al. | |
| 2017/0084162 | A1* | 3/2017 | Daher | G08B 25/007 |
| 2017/0256157 | A1 | 9/2017 | Johan et al. | |
| 2018/0122221 | A1* | 5/2018 | Norton | G08B 25/10 |

* cited by examiner

400

ADAPTATION OF A SECURITY CONTROL PANEL

CROSS REFERENCE TO RELATED APPLICATIONS

This application is a continuation of U.S. application Ser. No. 17/140,218, filed Jan. 4, 2021, which is a continuation of U.S. application Ser. No. 16/696,004, filed Nov. 26, 2019, which is a continuation of U.S. application Ser. No. 15/971,438, filed May 4, 2018, which claims the benefit of U.S. Provisional Application Ser. No. 62/504,042, filed May 10, 2017, and titled "Adaptation of a Security Control Panel." All of these prior applications are incorporated by reference in their entirety.

TECHNICAL FIELD

This disclosure relates to property monitoring technology and, for example, integrating a hub device with a legacy security panel at a monitored property.

BACKGROUND

Many people equip homes and businesses with monitoring systems to provide increased security for their homes and businesses. Security systems of a property include a security panel for controlling and routing alarm signal data associated with a property. The security panel may receive data from hardwired sensors throughout the property, and typically would use a Plain Old Telephone Systems (POTS) connection to transmit alarm data to a central monitoring station. In response to detecting an alarm condition within the property, the security panel may transmit a signal to the central monitoring station, which then dispatches emergency responders to the monitored property.

SUMMARY

Techniques are described for monitoring technology. For example, techniques are described for using a hub device to adapt a legacy security control panel to support more interactive control within the security system at the monitored property. A hub device is an electronic device that connects to the POTS output of the security panel, and includes a transceiver that allows the hub device to communicate with one or more wireless sensors. The hub device is also connected to the siren output and the key shunt of the security panel. Integrating the hub device into the security system bridges the gap between the functionality of the traditional legacy systems and the modern day "smart home" monitoring system. This allows the user to have the modern day customization advantages on the old platform without the financial burden of completely replacing the old system. The hub device also connects to the one or more zones of the security panel, and is configured to communicate zone activity to a backend server via the network.

According to an innovative aspect of the subject matter described in this application, a monitoring system includes a security panel that is connected to one or more hardwired sensors located at the property. The monitoring system includes a hub device that is connected to an output of the security panel, and that is in communication with one or more wireless sensors, and that is configured to receive one or more user set preferences for detecting a hub alarm condition and one or more actions to perform in response to detecting a hub alarm condition, receive, from the output of the security panel, data indicating that a traditional alarm condition occurred, based on receiving data indicating a traditional alarm condition occurred at the monitored property, receiving sensor data from at least one wireless sensor in a vicinity of a hardwired sensor associated with the traditional alarm condition, determine, based on the sensor data received from at least one wireless sensor in a vicinity of the hardwired sensor associated the traditional alarm condition, that the sensor data satisfies a condition, and in response to determining that the sensor data satisfies a condition, perform an action.

These and other implementations each optionally include one or more of the following optional features. The hub device is configured to receive, from the output of the security panel, data indicating that a traditional alarm condition occurred by, receiving a signal from a POTS output of the security panel, where, the signal received from the POTS output identifies a hardwire sensor associated with the traditional alarm condition. The hub device is configured to receive, from the output of the security panel, data indicating that a traditional alarm condition occurred by, receiving a signal from a siren output of the security panel. The hub device is configured to receive a first voltage from the security panel when an alarm condition is detected. The hub device is configured to perform an action in response to determining that the sensor data satisfies a condition by, sounding an alarm at the property. The hub device is configured to perform an action in response to determining that the sensor data satisfies a threshold by providing, to a user device of a resident of the property, a notification indicating that a traditional alarm condition occurred. The hub device is configured to produce an indication of the traditional alarm condition at the property to a central monitoring station.

The hub device is further configured to receive, from a wireless sensor, sensor data, compare the sensor data received from the wireless sensor to the one or more user set preferences for detecting a hub alarm condition, determine that the sensor data received from the wireless sensor meets a hub alarm condition, and in response to determining that the sensor data received from the wireless sensor meets the hub alarm condition, perform one or more actions. The hub device is configured to receive an instruction to arm the security panel, and arm the security panel by creating a physical connection between wire connections of a key shunt of the security panel. The hub device is configured to receive an instruction to arm the security panel by receiving an indication to arm the security panel through an application running on a user device.

According to another innovative aspect of the subject matter described in this application, a computer implemented method includes receiving one or more user set preferences for detecting a hub alarm condition and one or more actions to perform in response to detecting a hub alarm condition, receiving, from the output of the security panel, data indicating that a traditional alarm condition occurred, based on receiving data indicating a traditional alarm condition occurred at the monitored property, receiving sensor data from at least one wireless sensor in a vicinity of a hardwired sensor associated with the traditional alarm condition, determining, based on the sensor data received from at least one wireless sensor in a vicinity of the hardwired sensor associated the traditional alarm condition, that the sensor data satisfies a condition, and in response to determining that the sensor data satisfies a condition, performing an action.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF DRAWINGS

Like reference symbol in the various drawings indicate like elements.

DETAILED DESCRIPTION

A legacy security system is a traditional hardwired security system that is designed to detect alarm events, such as, an intrusion, or a fire at a property. A legacy security system may include various components such as a security panel that receives sensor inputs, tracks arm/disarm status at the property, and transmits detected alarm events to a central monitoring station. The legacy security system also includes hardwired sensors that are located throughout the property. The sensors are physically connected to the security panel through extensive hardwiring distributed throughout the property. The sensors can detect intruders by a variety of methods, such as, monitoring doors and windows for opening/closing, monitoring for fire, or other activities. Typically, a legacy security system communicates over Plain Old Telephone Systems (POTS) connection to transmit alarm data to a central monitoring station when an alarm condition is detected at a monitored property.

Legacy security systems face limitations as several advancements are occurring in the field of home security systems. The integration of wireless sensors has led to more integrated "smart homes" which in turn has led to an increase in customer interaction, control, and customization of the home security system. Through the integration of the home security system with several different wireless sensors, the security system can evolve to a monitoring system that not only alerts customers to intrusions and fire events, but also allows the user to receive customizable notifications of different monitoring events at the monitored property.

Techniques are described for integrating a hub device with the security control panel of a legacy home security system at a monitored property. A hub device is an electronic device that connects to the POTS output of the security panel, and includes a transceiver that allows the hub device to communicate with one or more wireless sensors. The hub device is also connected to the siren output, and the key shunt of the security panel. Integrating the hub device into the security system bridges the gap between the functionality of the traditional legacy systems and the modern day "smart home" monitoring system. This allows the user to have the modern day customization advantages on the old platform without the financial burden of completely replacing the old system. The hub device also connects to the one or more zones of the security panel, and is configured to communicate zone activity to a backend server via the network.

Figure 1:
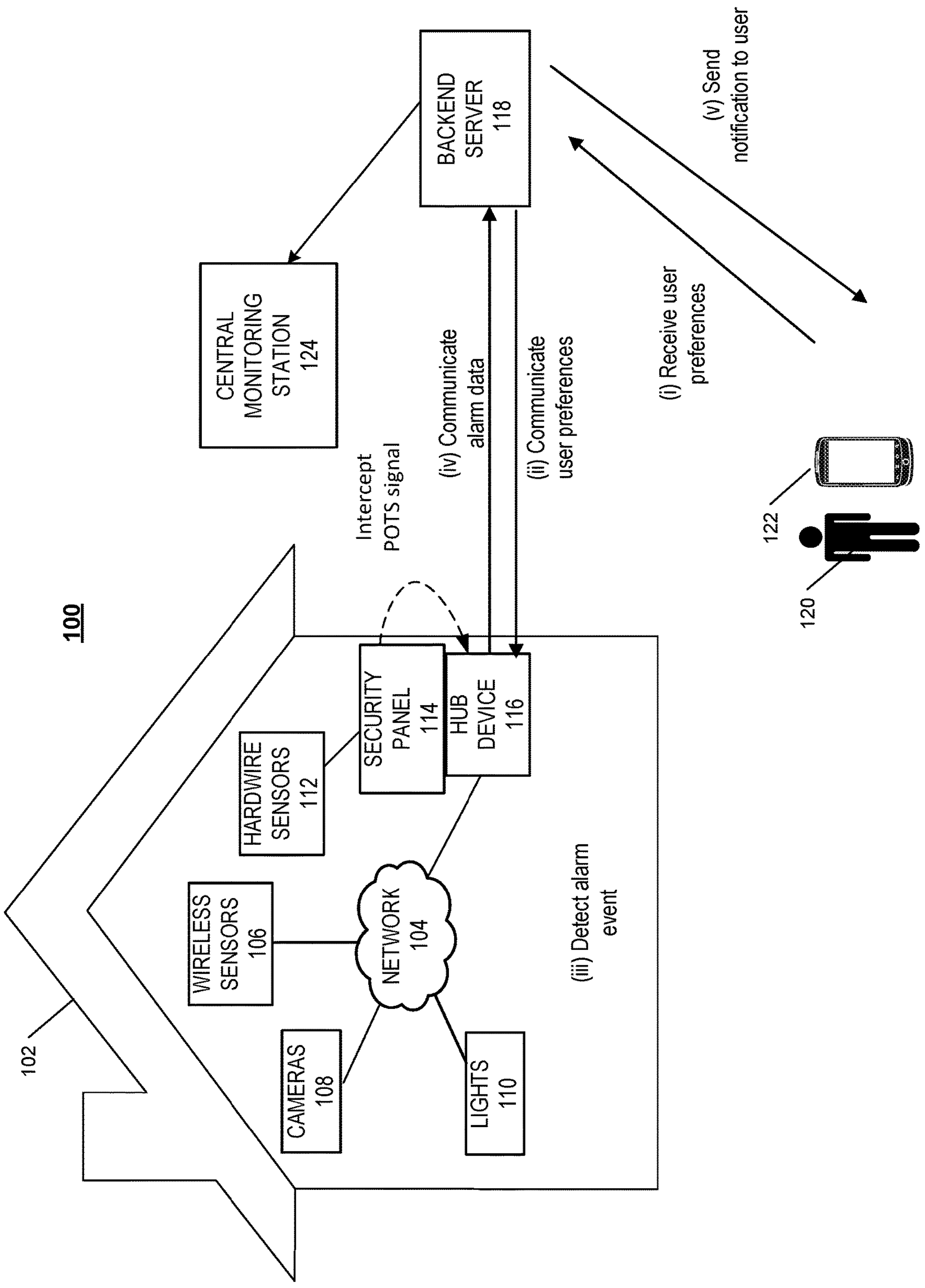
FIG. 1 illustrates an example of a legacy security system adapted with a hub device.

FIG. 1 illustrates an example of a home monitoring system 100 that is produced by adapting the security panel 114 of a legacy security system with a hub device 116. As shown in FIG. 1, a property 102 (e.g. a home) of a user 120 is monitored by an in-home monitoring system (e.g. in-home security system) that includes components that are fixed within the property 102. The in-home monitoring system may include a legacy security panel 114 that is adapted with a hub device 116, one or more hardwire sensors 112, one or more lights 110, one or more cameras 108, and one or more wireless sensors 106. The user 120 may integrate the security panel 114 of a legacy security system at the property 102 with the hub device 116 to facilitate the incorporation of the one or more wireless sensors 106, the one or more cameras 108, and the one or more lights 110. The incorporation of the wireless sensors 106, the one or more cameras 108, and the one or more lights 110 allows the user 120 to set user preferences for receiving notification for events at the monitored property 102. For example, the user may wish to receive notifications whenever a camera at the front door of the property 102 detects that someone is at the front door. The hub device 116 acts as a control unit for a monitoring system at the monitored property, and allows for communication with a backend server 118.

The one or more wireless sensors 106, the one or more cameras 108, and the one or more lights 110 at the monitored property are in communication with the hub device 116 through a network 104. The network 104 is configured to enable exchange of electronic communications between devices connected to the network 104. The one or more wireless sensors 106, the one or more cameras 108, and the one or more lights 110 may communicate with the hub device 116 through Zwave, Zigbee, BLE, LoRA, LPWan, GSM, CDMA, LTE, Wi-Fi, Powerline, PoE, Ethernet, other wireline, proprietary 900 Mhz/2.4 GHz/other radio frequency, or any other suitable method of communication. The network communication may also allow the sensor devices to communicate with the other devices through the monitored property. The integration of communication between the wireless devices, the hub device 116, the security panel 114, the backend server 118, and in turn the user device 122 allows the user 120 to have a more interactive experience with the home security system. The hub device 116 acts as the control unit for the in-home monitoring system at the property.

In the example illustrated in FIG. 1, a backend server 118 receives user preferences from the user device 122 of a user 120 associated with the monitored property 102. The user device 122 may include a native home monitoring application that allows the user to set customized preferences for the control and automation of the home monitoring system. For example, the user may set preferences to receive notification when a door knob sensor in the kid's bedroom is opened after a set time (for example, the kid's bedtime). The user may also set arm/disarm schedules and may identify what type of notification is preferred based on the time of detection of any particular event. The user may integrate each of the one or more wireless sensors 106 by creating rules for each sensor through a cloud server. For example, the user 120 may create rules for each of the one or more wireless sensors through the backend server 118. The user may also create rules for each of the one or more hardwired zones. In more detail, the security panel may be configured to include one or more zones which each may have a different alarm signal associated with each zone. Based on customer preference, each of the zones may be configured, through the hub device 116 to have an associated response and or notification preference.

The user device 122 is a device that hosts and displays user interfaces. The user device 122 may be a cellular phone or a non-cellular locally networked device with a display. The user device 1222 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 122 may perform functions unrelated to the monitoring system, such as placing personal telephone calls, playing music, playing video, displaying pictures, browsing the Internet, maintaining an electronic calendar, etc.

The native monitoring application refers to a software/firmware program running on the corresponding mobile device that enables the user interface and features described throughout. The native monitoring application is managed by a backend server. The user device 122 may load or install the native monitoring application based on data received over a network or data received from local media. The native monitoring application runs on mobile devices platforms, such as iPhone, iPod touch, Blackberry, Google Android, Windows Mobile, etc. The native monitoring application enables the user device 122 to receive and process image and sensor data from the monitoring system.

The backend server 118 may store the received user preferences in memory associated with the backend server 118. The backend server 118 may be a cloud server that is associated with a native monitoring application that runs on a user device 122. The backend server 118 may be configured to manage data associated with several home monitoring systems. The backend server 118 is an electronic device configured to store data associated with user set preferences and provide monitoring services by communication with the hub device 116 and one or more user devices over a network. For example, the backend server 118 may be configured to monitor events (e.g., alarm events) generated by the hub device 116.

As illustrated in FIG. 1, an alarm event is detected at the monitored property 102. In some examples, one or more hardwire sensors 112 detect an alarm event while the security panel 114 is in an armed state. For example, a contact sensor on a door at the monitored property 102 may be tripped by an intruder. The contact sensor may be a hardwired into the structure of the property 102, and may part of the original security system installed at monitored property 102. When the security panel 114 is in an armed state, wire connections of a key shunt connection of the security panel 114 form a physical short, that is the wire connections of the key shunt are in a closed position. Traditionally, when a hardwire sensor 112 detects an alarm event and communicates the detected alarm event to the security panel 114, the security panel 114 transmits the alarm event data over the POTS output of the security panel 114 to a central monitoring station 124. However, as shown, the hub device 116, which is connected to the POTS output of the security panel 114, intercepts the POTS signal. Instead of the alarm event data being transmitted directly from the security panel 114 to the central monitoring station 124, the alarm event data is transmitted into the hub device 116.

In other examples, the hub device 116 detects an alarm event based on sensor data received from one or more wireless sensors 106 while the security panel is in an armed state. In some instances, the detected alarm event may be a traditional alarm event. For example, a carbon monoxide sensor may detect carbon monoxide at the monitored property 102. In other instances, the detected alarm event may not be a traditional alarm event, and may be an event that meets a criteria set by the user 120. The user set preferences may be communicated from the backend server 118 to the hub device 116 at the monitored property 102. When one of the user set preferences are meet by one or more of the wireless sensors at the property, the hub device 116 detects an alarm event. For example, the user may set a preference to receive a notification each time a particular light is switched on. For another example, the user may set a preference to receive a notification when the thermostat reaches a desired temperature.

The hub device 116 transmits the alarm event data to the backend server 118. The alarm event data may be communicated to the backend server 118 over by any suitable communication method. For example, the alarm data may be transmitted over a cellular connection. When the communicated alarm data represents data that, based on the user preferences should be communicated to the central monitoring station 124, the backend server 118 transmits the data to the station 124. For example, when the detected alarm is a fire or an intrusion, the alarm data is transmitted to the central monitoring station 124. The central monitoring station 124 is an electronic device configured to provide alarm monitoring service by exchanging communications with the backend server 118. The central monitoring station 124 may notify the appropriate emergency personnel to respond to the alarm event at the monitored property 102. For example, the central monitoring station 124 may dispatch fire services to respond to a detected fire alarm.

In examples where the detected alarm event is based on a user set preferences, the backend server 118 communicates a notification to the user device 122 of the user 120. For example, the user may set preferences for receiving an in-app message when a camera at the monitored property 102 detects the family pet is feeding in the garage. In this example, the user 120 may also request receiving video recording of the pet feeding in the garage. In other examples, the user 120 may request to receive an in-app message if an alarm notification is sent to the central monitoring station 124. In these examples, the backend server 118 may notify the user 120 when the backend server 118 transmits alarm data to the central monitoring station 124, and may send a second notification when the central monitoring station 124 dispatches the appropriate emergency personnel to the monitored property 102.

Figure 2:
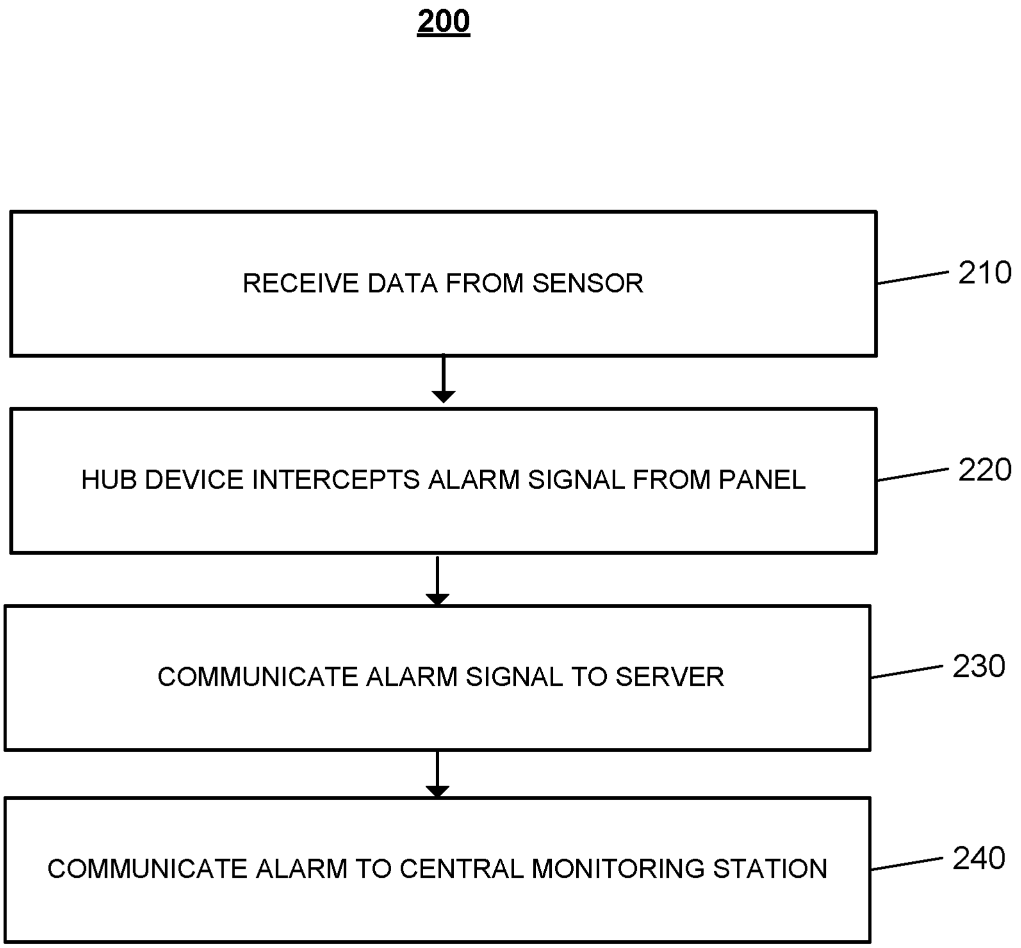
FIG. 2 is a flow chart of an example process for communicating alarm data to a central monitoring station.

FIG. 2 illustrates an example process 200 for communicating alarm data to a central monitoring station 124. The security panel 114 receives data from a sensor located within the monitored property 102 (210). The legacy security system may be a hardwired system that includes one or more hardwired sensors 112 which are used to detect a security breach at the property 102. When the security panel 114 is in an armed state, and the security panel 114 receives data from a hardwire sensor 112, the panel 114 changes to an alarm state. For example, when a contact sensor on a window detects that the contact sensor has been opened, while the security system is in an armed state, the contact sensor communicates the detected alarm data to the security panel 114, causing the security panel 114 to change to an alarm state.

In some examples, the legacy security system may be supplemented with one or more additional sensors. For example, the legacy security panel 114 may support wireless sensors 106 through the hub device 116. The hub device 116 may include a transceiver that allows the hub device 116 to communicate with the one or more wireless sensors 106. The legacy security panel 114 may support several zones, and one or more wireless sensors 106 may be added as a zone through a cloud server which is in communication with the hub device 116. The security panel 114 of a legacy security system does not include a data bus, and may only receive data directly from the hardwired sensors, however, the hub device 116 may communicate with one or more wireless sensors through any suitable type of wireless communication. For example, the hub device 116 may communicate with the one or more wireless sensors 106 through "Wi-Fi" wireless Ethernet (e.g., using low-power Wi-Fi chipsets), Z-Wave, Power Over Ethernet (POE), Zigbee, Bluetooth, "HomePlug" or Powerline.

The hub device 116 intercepts the alarm signal from the security panel 114 (220). A typical legacy security panel communicates over the telephone lines of Plain Old Telephone Systems (POTS) to a central monitoring station to notify of alarm events at a monitored property 102. When a security panel is adapted with the hub device 116 to facilitate receiving data from wireless sensors 106, the panel 114 does not communicate to the central monitoring station through the established POTS connection. Instead, the alarm signal generated by the panel 114 is intercepted by the hub device 116 which is connected to the POTS output of the security panel 114.

The alarm event signal is communicated to a backend server 118 (230). The intercepted alarm event signal is communicated to the backend server 118. The hub device 116 may transmit the intercepted alarm event signal to the backend server 118 over a cellular connection. The backend server 118 may be a cloud server that is associated with a native monitoring application that runs on a user device 122. The backend server 118 may be configured to manage data associated with several home monitoring systems. The backend server 118 may store data associated with user set preferences and rules for receiving notifications for detected alarm events. The user may set preferences through the native monitoring application on the user's device 122. For example, the user 120 may set preferences to receive a text notification whenever an alarm situation is detected at the monitored property 102. The backend server 118 communicates the alarm data to a central station (240). The central monitoring station 124 receives that alarm data and then dispatches emergency responders to the monitored property 102. The backend server 118 may communicate with the central monitoring station 124 by any suitable communication means. For example, the backend server 118 may transmit a cellular connection to the central monitoring station 124.

Figure 3:
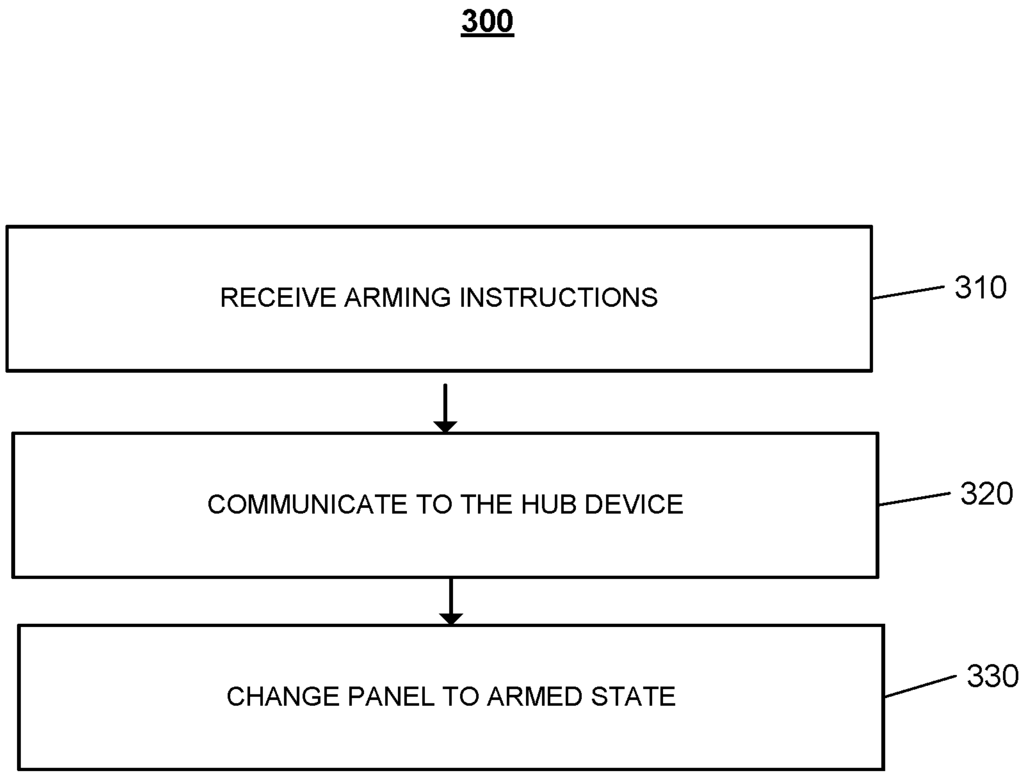
FIG. 3 is a flow chart of an example process for arming the panel through a native monitoring application.

FIG. 3 illustrates an example process 300 for arming the security panel 114 through the native monitoring application. The backend server receives arming instructions (310). The backend server 118 is the server that manages the native monitoring application on the user device 122. The native monitoring application allows the user 120 to set preferences for notifications from the security system, and the user 120 also has the ability to arm and disarm the security panel 114 through the application. The user preferences and other data input by the user into the native monitoring application is stored at the backend server 118. The user 120 may navigate the native monitoring application and select to arm the security panel 114. In other examples, the user 120 may set up an arming schedule through the application. When the application receives a command from the user 120 to arm, either directly from the user selecting an arming option, or through a set arm schedule, the instruction is received by the backend server 118.

The backend server 118 communicates the arming instructions to the hub device 116 (320). The backend server 118 may transmit the arming instruction to the hub device 116 over a cellular connection. The hub device 116 then changes the security panel 114 to an armed state (330). The legacy security panel includes a key shunt connection that facilitates the arming and the disarming of the security system. When the key shunt is opened, the wire connections of the key shunt form an open circuit and the system is not armed. When the key shunt is closed, the wire connections of the key shunt physically close (short) a circuit and the system is armed. The hub device 116 may be connected in parallel to the key shunt of the security panel 114, and may mirror the connection of the key shunt to either arm or disarm the panel 114. When the hub device 116 receives the signal from the backend server 118 to arm the panel, the hub device 116 may short the wire connections of the key shunt to arm the panel 114.

In some implementations, the hub device 116 may include a touch panel that may be used to control the security panel. The touch panel may be an LCD touch panel that includes LED status indicator lights that may indicate when the panel is armed and when the panel is disarmed. The LCD touch panel may be used instead of the display on the security panel 114 to arm and disarm the security panel. The LCD touch panel may reflect the arming status of the panel received through the native monitoring application. When the panel is armed by the user, the LED status indicator may light red, and may light green when the system is disarmed.

Figure 4:
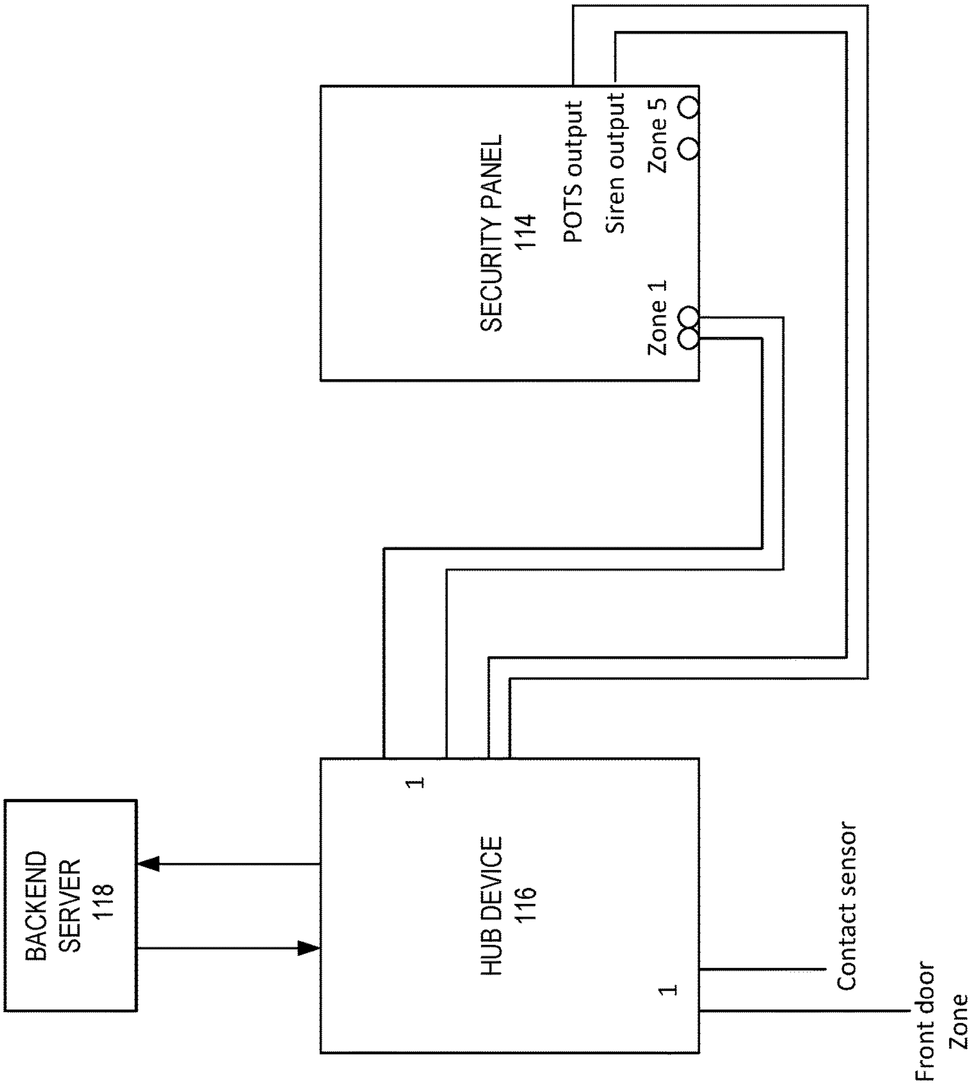
FIG. 4 is an example of connections between the hub device and the security panel.

FIG. 4 is an example of the connections between the hub device 116 and the security panel 114. The security panel 114 may include one or more hardwired zones, for the example illustrated in FIG. 4 the security panel may have five hardwired zones. The hub device 116 may be connected to the security panel 114 as a zone. The output of the one or more zones of the hub device 116 may be connected to the input of the zones of the security panel 114. For example, the output of zone 1 of the hub device 116 is connected to zone 1 of the security panel 114. The input of the one or more zones of the hub device 116 may be connected to one or more wireless sensors. As illustrated in FIG. 4, one of the input wires of zone 1 of the hub device 116 is connected to a contact sensor. The user may integrate one or more wireless sensors into the security system by connecting the wireless sensors to the hub device 116 and subsequently wiring the output of the zones of the hub device 116 to the appropriate zone of the security panel 114.

The user may create rules for each of the one or more wireless sensors added to the hub device through a cloud server. For example, the user 120 may create rules for each of the one or more wireless sensors through the backend server 118. The user may also create rules for each of the one or more hardwired zones. The user may associate a different alarm signal for each of the zones of the security panel 114. The user may also configure, through the use of the backend server 118, different notification preferences for particular alarm situations. For example, the user may set preferences to receive a message notification whenever a motion sensor connected to zone 4 of the security panel 114 detects motion. When a wireless sensor that is connected to a zone of the hub device 116 detects an alarm condition, hub device 116 may trip the security panel 114 to generate an audible alarm. For example, the front door zone sensor connected to the hub device 116 may be tripped by an intruder. The hub device 116 may communicate the detected alarm condition to zone 1 of the security panel 114 and cause the security panel to siren. The wireless sensor may simultaneously may send the detected alarm data to the backend server 118. The backend server 118 may in turn then communicate the alarm data to a central monitoring server.

Figure 5:
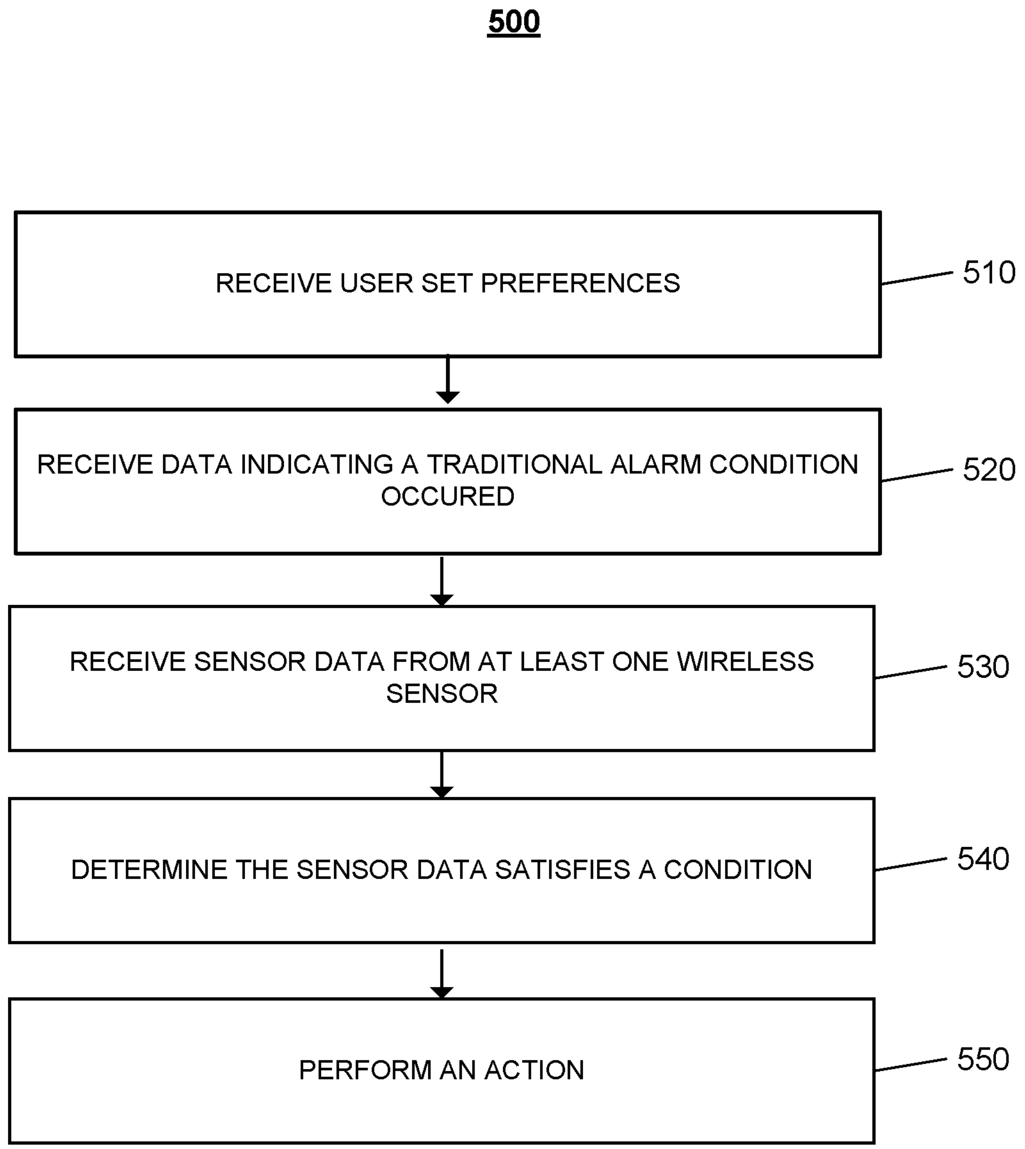
FIG. 5 is a flow chart of an example process for performing an action.

FIG. 5 illustrates an example process 500 for performing an action. The process 500 may be performed by a monitoring system at a property that includes a legacy security panel that is connected to one or more hardwired sensors located throughout the property. For example, the process 500 may be performed by the hub device 116 that is configured to adapt the legacy security panel 114 to allow more interactive control of the monitoring system 100. The process 500 includes receiving one or more user set preferences for detecting a hub alarm condition and one or more actions to perform in response to detecting a hub alarm condition (510). For example, the hub device 116 may receive one or more preferences set by a resident user 120 of the monitored property 102 through a native monitoring system application on a user device 122. The backend server 118 that manages the monitoring application may store the user set preferences in its memory, and may communicate the user set preferences to the hub device 116. In some implementations, the hub device 116 may manage the monitoring application. In these implementations, the hub device 116 receives the preferences set by the user 120 through the monitoring application.

The user 120 may wish to set preferences for different conditions that would prompt the hub device to perform an action. For example, the user 120 may set a preference to receive a sound an alarm when a carbon monoxide sensor detects carbon monoxide levels over a threshold. The user 120 may set one or more preferences for each of the one or more wireless sensors 106 that are integrated into the monitoring system. For examples, the user 120 may set a preference to receive a notification when the back door is left open for longer than a threshold period of time. In some implementations, the user 120 may set a schedule for automatically arming and disarming the monitoring system at the property. In these implementations, the user 120 may set specific times for the monitoring system to be armed, and other specific times fort the monitoring system to disarm. For example, the user may set a schedule for the monitoring system to disarm each week day morning at 6:00 AM.

The process 500 includes receiving data indicating that a traditional alarm condition occurred from the output of the security panel (520). For example, the hub device 116 receives data indicating an alarm condition from a hardwired sensor. The hub device 116 may be electronic device that is connected to the POTS output of the security panel 114. The hub device 116 includes a transceiver that allows the hub device 116 to communicate with one or more wireless sensors 106, and other electronic devices located throughout the monitored property 102. When a hardwired sensor at the property 102 detects an alarm condition when the security panel 114 is in an armed state, the hardwire sensor communicates the detected alarm condition to the security panel 114. The security panel 114 is configured to communicate the detected alarm condition, via a POTS output, to a central monitoring station. However, the hub device 116 intercepts the POTS output from the security panel 114. For example, when a contact sensor determines a window is opened, the contact sensor communicates the "window open" data to the security panel 114, and the hub device 116 receives the "window open" data that indicates an alarm condition by intercepting the POTS output of the security panel 114. The data communicated from the hardwired sensor is communicated over the wired zone connection associated with the hardwire sensor. The security panel 114 determines the location of the hardwire sensor based on the identification of the hardwired sensor. The hardwired sensor may be identified based on the zone of the security panel 114 that the hardwire sensor is connected to. In some implementations, the data communicated to from the hardwire sensor that detects an alarm condition, identifies the sensor and the location of the sensor within the property. For example, when a contact sensor on the kitchen window detects that the window is opened, while the security panel is in an armed state, the contact sensor communicates the window open alarm condition to the security panel 114, the data includes a sensor identifier that indicates the sensor and the location of the sensor within the property.

The process 500 involves receiving sensor data from at least one wireless sensor in a vicinity of a hardwired sensor associated with the traditional alarm condition (530). For example, the hub device 116 may receive sensor data from a wireless carbon monoxide sensor in the vicinity of the hardwired carbon monoxide sensor. The hub device 116 may receive sensor data from one or more additional sensors to confirm the alarm condition detected by the hardwire sensor. In some implementations, when the hub devices 116 receives the POTS output signal from the security panel 114, the hub device 116 prompts one or more sensors to communicate sensor data to the hub device 116. For example, when a hardwired carbon monoxide sensor detects high levels of carbon monoxide, the hub device 116 may prompt a wireless carbon monoxide sensor in the vicinity of the hardwired sensor to communicate sensor data to the hub device 116. The hub device 116 determines the location of the hardwired sensor that detects an alarm condition based on data received from the sensor. The sensor data received from the hardwire sensor indicates the zone of the security panel In other implementations, when the hub device 116 receives the POTS output signal from the security panel 114, the hub device 116 automatically receives sensor data from one or more sensors. In some examples, the hub device 116 may receive sensor data from one or more sensors located in an immediate vicinity of the hardwire sensor that detected an alarm condition. For example, the hub device 116 may receive sensor data from each of the one or more sensors in the room with the hardwire sensor. In other examples, the hub device 116 may receive sensor data from a subset of wireless sensors located throughout the monitored property 102.

The process 500 involves determining that the sensor data satisfies a condition (540). For example, the hub device 116 determines that sensor data received from a wireless carbon monoxide sensor exceeds a carbon monoxide threshold. The hub device 116 may analyze the additional sensor data received from one or more wireless sensors in the vicinity of the hardwire sensor to determine confirm the alarm condition is detected. For the example mentioned above, the hub device 116 may receive additional sensor data from one or more other carbon monoxide sensors in proximity to the hardwired sensor that detected the alarm condition. The hub device 116 may compare the additional sensor data to a carbon monoxide threshold to determine whether the detected carbon monoxide levels exceed the carbon monoxide threshold. In some implementations, the carbon monoxide threshold may be a user set threshold.

In another example, where a hardwired sensor detects an intrusion, for example, when a contact sensor at the front door is opened when the security panel 114 is armed, the hub device 116 may receive additional sensor data from one or more wireless sensors located throughout the monitored property. For example, the hub device 116 may prompt one or more motion sensors to provide sensor data. The hub device 116 may compare the motion sensor data received to a motion threshold. For example, the hub device 116 may prompt one or more cameras to capture image data. In these examples, the hub device 116 may use facial recognition and other processing techniques to analyze the received video data to determine whether an unknown person is within the property.

The process 500 involves performing an action in response to determining that the sensor data satisfies a condition (550). For example, the hub device 116 sounds an alarm in response to determining that the carbon dioxide sensor data exceeds a carbon monoxide threshold. When the hub device 116 analyzes the data received from one or more wireless sensors, and determines that the sensor data satisfied a condition or a user set preference, the hub device 116 performs one or more actions. For example, when the hub device 116 compares the sensor data received from one or more carbon monoxide sensors in the vicinity of a hardwired carbon monoxide sensor, and the sensor data exceeds a carbon monoxide level, the hub device may sound an audible alarm. The hub device 116 may communicate the detected alarm event to the central monitoring station 124. In some examples, the hub device 116 may communicate a notification to the user device 122 of a resident 120 of the property. The notification may indicate that the central monitoring station 124 has been contacted, and may indicate what caused the alarm event. The notification may be communicated as an in application message to the monitoring system application. In other examples, the hub device 116 may prompt an audible alarm at the monitored property to sound.

In some implementations, the hub device 116 may confirm an alarm condition when at least one wireless sensor in the vicinity of hardwired sensor that detects the alarm condition satisfies a condition. For example, a hardwired contact sensor detects a window is opened, and a wireless contact sensor on the window also detects the window is opened. In other implementations, the hub device 116 confirms an alarm condition when two or more wireless sensors in the vicinity of the hardwire sensor that detects the alarm condition satisfies a condition. In these implementations, the hub device 116 does not perform an action when only one wireless sensor confirms a condition. The hub device 116 may wait to receive sensor data from at least two sensors that satisfies a condition before performing an action. When the hub device 116 does not receive additional sensor data from wireless sensors to confirm the alarm condition, the hub device does not perform an action.

In some implementations, the hub device 116 is configured to perform an action in response to the data received from a hardwired sensor. In these implementations, the hub device 116 may be configured to perform an action based on which of the hardwired sensors detected an alarm condition. For example, when a hardwired contact sensor detects a window is opened when the security panel 114 is in an armed state, the hub device 116 receives data indicating the alarm condition from the output of the security panel 114, and the hub device 116 generates an audible alarm. In these implementations, the hub device 116 may not be configured to receive data from one or more wireless sensors when an alarm condition is detected by a hardwired sensor.

In some implementations, the hub device 116 is configured to intercept the siren output of the security panel 114. A hardwired sensor at the property 102 may detect an alarm condition when the security panel 114 is in an armed state, and may communicate the detected alarm condition to the security panel 114. For example, a hardwired contact sensor determines a door is opened, and the contact sensor communicates the "door open" data to the security panel 114. When the security panel 114 determines there is an alarm condition based on input from a hardwired sensor, the security panel 114 may begin to output 12V from the siren output to trigger a siren at the monitored property 102. E.g., change from outputting 0V from the siren output to outputting 12V from the siren output.

In these implementations, where the hub device 116 is configured to intercept the siren output of the security panel 114, a twelve volt (12V) output from the siren output indicates an alarm condition to the hub device 116. The siren may be an audible siren that indicates the detected alarm condition to the resident of the property, or the siren may be a visual siren, such as a strobe light, that flashes to indicate the detected alarm condition to the resident of the property. The siren output may be configured to continuously output 12V to trigger the siren until the security panel 114 is disarmed. However, the hub device 116 intercepts the siren output from the security panel 114. For example, when a carbon monoxide sensor detects high carbon monoxide levels, the carbon monoxide sensor communicates the "high carbon monoxide level" data to the security panel 114, and the hub device 116 receives the 12V siren output indicating the detected alarm.

In some implementations, the description above related to the hub device 116 receiving input from the POTS output of the security panel 114 may similarly apply to the hub device 116 receiving input from the siren output of the security panel 114. For example, the hub device 116 may receive "window open" data indicating a tripped contact sensor from the siren output instead of the POTS output and, similarly to as described above, the hub device 116 may receive a 12V signal from the siren output.

The hub device 116 may simultaneously intercept the POTS output of the security panel 114. When the hardwire sensor detects the alarm condition, and communicates the alarm condition to the security panel 114, the security panel 114 may transmit data over the POTS output of the security panel 114, and simultaneously transmit the 12V to the siren output of the panel 114. Traditionally, when the security panel 114 detects an alarm condition, an alarm communicator of the security panel 114 initiates communication with the central monitoring station 124 by dialing a telephone number to a receiver of the central monitoring station 124. When the receiver of the central monitoring station 124 accepts the communication from the security panel 114 by connecting though the POTS line, the data from the security panel 114 is received by the central monitoring station 124. When the security panel 114 outputs from the POTS output and the siren output simultaneously, the hub device 116 intercepts the both output signals simultaneously. In some examples, the security panel 114 may output the siren output initially, and may then output the POTS output when the security panel has not been disarmed after a threshold period of time. For example, the security panel 114 may output the siren output for two minutes, and may then put the POTS output if the security panel is not disarmed.

The hub device 116 is configured to perform one or more actions in response to receiving data indicating that an alarm condition is detected. For example, the hub device 116 sounds an alarm in response to receiving data indicating that a front door contact sensor is tripped. The hub device 116 is configured to analyze the data received from the security panel 114 to determine whether the data satisfies a user set preference. In some implementations, the hub device 116 may be configured to receive sensor data from one or more wireless sensors in the vicinity of the hardwired sensor that detected an alarm condition before the hub device 116 performs an action. In these implementations, the security panel 114 determines the location of the hardwired contact sensor that detected an alarm condition based on the zone of the security panel that the hardwired sensor is connected to. The security panel 114 may communicate the zone data to the hub device 116 to indicate the identity of the hardwire sensor that detected an alarm condition to the hub device 116. For example, the security panel 114 may communicate the zone data to the hub device along with the siren output.

The hub device 116 may then command one or more sensors in the vicinity of the zone of the hardwired sensor to communicate sensor data to the hub device 116. The hub device 116 analyzes the sensor data received from the one or more wireless sensors in the vicinity of the hardwired device, and compares the received sensor data to the user set preferences. The hub device performs an action when the sensor data received from the one or more wireless sensors in the vicinity of the hardwired device meets a user set preference. For example, when the hub device 116 compares the sensor data received from one or more carbon monoxide sensors in the vicinity of a hardwired carbon monoxide sensor, and the sensor data exceeds a carbon monoxide level, the hub device 116 may sound an audible alarm.

The hub device 116 may also communicate the detected alarm event to the central monitoring station 124 by communicating via a cellular connection with the station 124. For example, the hub device 116 may serve as a pass through between the POTS output of the security panel 114 and the central monitoring station 124 so that telephone audio tones are transmitted between the security panel 114 and the hub device 116 through a hard wire connection of the POTS output of the security panel 114 and between the hub device 116 and the central monitoring station 124 through a cellular connection. In another embodiment, the hub device 116 may instead emulate behavior of a legacy central monitoring station to the legacy security panel 114. For example, the hub device 116 may provide a dial tone to the security panel 114 and in response to the security panel 114 then outputting telephone tones for calling the legacy central monitoring station, output telephone tones that the legacy central monitoring station would have provided to the legacy security panel 114 to the security panel 114 over the POTS output to trigger the security panel 114 to determine that a connection has been established with a legacy central monitoring station and then output alarm data through the POTS output that the hub device 116 can then intercept.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method comprising:

intercepting, by a hub device connected to a plain old telephone system connection of a hardwired security panel that received sensor data indicative of an alarm event, a voltage output i) sent from the security panel using the plain old telephone system connection and ii) for a central monitoring system;

determining whether the intercepted voltage output represents an alarm signal for the central monitoring system; and in response to determining that the intercepted voltage output represents an alarm signal, providing, by the hub device and to a backend system using a network other than the plain old telephone system, the alarm signal to cause the backend system to provide data for the alarm signal to the central monitoring system.

2. The method of claim 1, wherein intercepting, by the hub device, the alarm signal prevents the security panel from communicating with the central monitoring system through the plain old telephone system connection.

3. The method of claim 1, comprising:

receiving, by the hub device, data from one or more wireless sensors; and providing, by the hub device, the data from the one or more wireless sensors to the security panel using the plain old telephone system connection.

4. The method of claim 3, wherein receiving the data comprises receiving, by a transceiver included in the hub device and that enables the hub device to communicate with the one or more wireless sensors, the data from the one or more wireless sensors.

5. The method of claim 1, wherein communicating, by the hub device, the alarm signal to the backend system comprises communicating over a cellular connection.

6. The method of claim 5, wherein communicating over the cellular connection comprises either sending the alarm signal, receiving the data for the alarm signal, or both.

7. The method of claim 1, wherein providing the alarm signal to the backend system causes the backend system to communicate with a monitoring application on a client device that enables the client device to process data for the alarm signal.

8. The method of claim 1, wherein the alarm signal includes an instruction for an audible alert.

9. A system comprising one or more computers and one or more storage devices on which are stored instructions that are operable, when executed by the one or more computers, to cause the one or more computers to perform operations comprising:

intercepting, by at least one computer from the one or more computers that is connected to a plain old telephone system connection of a security panel that is hardwired to one or more sensors and configured to receive sensor data indicative of an alarm event, a voltage output i) sent from the security panel using the plain old telephone system connection and ii) for a central monitoring system;

determining whether the intercepted voltage output represents an alarm signal for the central monitoring system; and in response to determining that the intercepted voltage output represents an alarm signal, providing, to a backend system using a network other than the plain old telephone system, the alarm signal to cause the backend system to provide data for the alarm signal to the central monitoring system.

10. The system of claim 9, wherein intercepting the alarm signal prevents the security panel from communicating with the central monitoring system through the plain old telephone system connection.

11. The system of claim 9, wherein the operations further comprise:

receiving data from one or more wireless sensors; and providing the data from the one or more wireless sensors to the security panel using the plain old telephone system connection.

12. The system of claim 11, wherein receiving the data comprises receiving, by a transceiver included in one of the one or more computers and that enables the one or more computers to communicate with the one or more wireless sensors, the data from the one or more wireless sensors.

13. The system of claim 9, wherein communicating the alarm signal to the backend system comprises communicating over a cellular connection.

14. The system of claim 13, wherein communicating over the cellular connection comprises either sending the alarm signal, receiving the data for the alarm signal, or both.

15. The system of claim 9, wherein the providing the alarm signal to the backend system causes the backend system to communicate with a monitoring application on a client device that enables the client device to process data for the alarm signal.

16. The system of claim 9, wherein the alarm signal includes an instruction for an audible alert.

17. One or more non-transitory computer storage media encoded with instructions that, when executed by one or more computers, cause the one or more computers to perform operations comprising:

intercepting, by at least one computer from the one or more computers that is connected to a plain old telephone system connection of a hardwired security panel that received sensor data indicative of an alarm event, a voltage output i) sent from the security panel using the plain old telephone system connection and ii) for a central monitoring system;

determining whether the intercepted voltage output represents an alarm signal for the central monitoring system; and in response to determining that the intercepted voltage output represents an alarm signal, providing, to a backend system using a network other than the plain old telephone system, the alarm signal to cause the backend system to provide data for the alarm signal to the central monitoring system.

18. The computer storage media of claim 17, intercepting, the alarm signal prevents the security panel from communicating with the central monitoring system through the plain old telephone system connection.

19. The computer storage media of claim 17 wherein the operations further comprise:

receiving data from one or more wireless sensors; and providing the data from the one or more wireless sensors to the security panel using the plain old telephone system connection.

20. The computer storage media of claim 19, wherein receiving the data comprises receiving, by a transceiver included in in one of the one or more computers and that enables the one or more computers to communicate with the one or more wireless sensors, the data from the one or more wireless sensors.

* * * * *